April 15, 1952   C. H. WHITE   2,592,987
DISK HARROW ANGLING LINK
Filed Oct. 22, 1947   2 SHEETS—SHEET 1

INVENTOR.
CHARLES H. WHITE
BY
ATTORNEYS

April 15, 1952     C. H. WHITE     2,592,987
DISK HARROW ANGLING LINK

Filed Oct. 22, 1947     2 SHEETS—SHEET 2

*INVENTOR.*
CHARLES H. WHITE
BY
ATTORNEYS

Patented Apr. 15, 1952

2,592,987

UNITED STATES PATENT OFFICE 2,592,987

DISK HARROW ANGLING LINK

Charles H. White, Moline, Ill., assignor to Deere & Company, Moline, Ill., a corporation of Illinois Application October 22, 1947, Serial No. 781,369

2 Claims. (Cl. 55—83)

The present invention relates generally to agricultural implements and is more particularly concerned with disk harrows, especially tandem and double action disk harrows.

In tandem or double action disk harrows the harrow gangs are swung between angled or working and straightened or transport positions and usually the front and rear gangs are connected together by a linkage which facilitates the simultaneous movement of the gangs between said positions, not only for the purpose of bringing the harrow into and out of transport position but also for the purpose of adjusting or changing the working angle between the gangs. Not infrequently harrows of this type are called upon to operate over relatively uneven ground with the result that one or the other of the gangs in following the ground surface may swing upwardly or downwardly at its outer end relative to the other gang, which imposes twists and strains on the angling linkage that connects the front and rear gangs.

The object and general nature of the present invention is the provision of a new and improved disk harrow having interconnecting linkage extending between the front and rear gangs and so constructed and arranged as to accommodate up and down movement of one gang relative to the other without twisting or causing any binding in the interconnecting linkage. More specifically, it is a feature of the present invention to provide interconnecting linkage between the front and rear gangs of a disk harrow so constructed and arranged that freedom of movement yet accurate angling control is present irrespective of whether the harrow is operating over level ground or over uneven ground having hollows, ridges and the like. More particularly, it is a feature of this invention to provide interconnecting linkage between the front and rear gangs of the harrow, embodying brackets fixed to the respective gangs and an interconnecting link connecting the outer ends of the brackets through spaced apart link sections and spherical bushings accommodating movement of the brackets and interconnecting link into different angular positions as the harrow gangs move up and down when passing over uneven ground.

These and other objects and advantages of the present invention will be apparent to those skilled in the art after a consideration of the following detailed description, taken in conjunction with the accompanying drawings:

Figure 1:
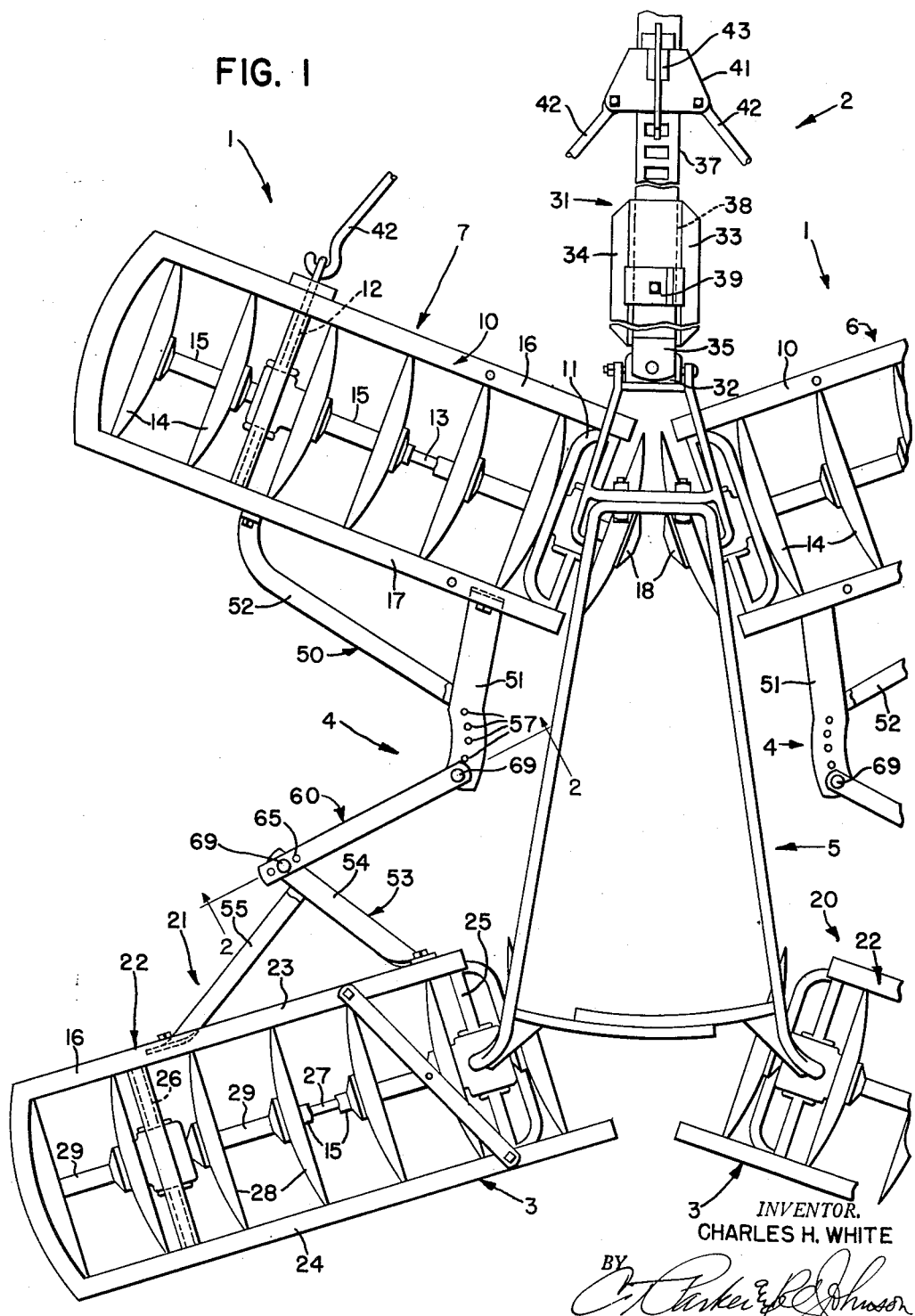
Figure 1 is a partial plan view of a disk harrow in which the principles of the present invention have been incorporated.
Figure 2:
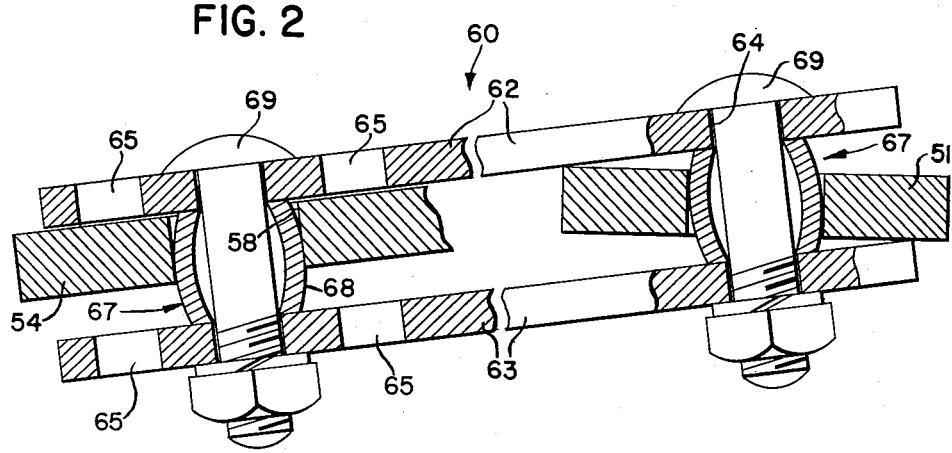
Figure 2 is an enlarged sectional view taken generally along the line 2—2 of Figure 1, showing the position of the interconnecting linkage between the front and rear gangs when the gangs pass over uneven ground.

Referring now to the drawings, the preferred form of harrow, as shown in Figures 1 and 2, comprises a front set of gangs, indicated in its entirety by the reference numeral 1, to which hitch means 2 is pivotally connected, a rear set of gangs and connections therebetween including angling linkage 4 and frame means 5.

The front set of gangs includes a right-hand gang 6 and a left-hand gang 7, each gang including a frame 10 and laterally inner and outer brackets 11 and 12 which receive the bearings in which the disk shaft or gang bolt 13 is journaled for rotation. Disks 14 are mounted on the gang bolt 13 and are held in proper spaced relation by spools 15, as in conventional construction. Preferably, the frame 10 of each gang consists of angle members, including a front frame angle 16 and a rear frame angle 17 arranged preferably with their vertical flanges extending downwardly to facilitate receiving the connecting linkage 4 as will be explained below. It will be noted that the front disks 14 are arranged to throw the soil laterally outwardly, and hence the front gangs 6 and 7 are termed outthrow gangs. The inner end of each gang bolt 13 of the front gangs receives a bumper 18, and the bumpers 18, as shown in Figure 1, are normally in rolling contact when the harrow is in operation, sustaining the laterally inwardly directed thrusts due to the soil pressure against the lower edges of the disks 14.

The rear set of gangs is of similar construction, embodying two gangs 20 and 21, each having a frame 22 including front and rear angle members 23 and 24, together with suitable brackets 25 and 26 upon which the gang bolt 27 suporting the disks 28 is journaled for rotation and upon which the disks 28 are maintained in spaced apart relation by spacing spools 29. It will be noted that the rear disks 28 throw the soil laterally inwardly in operation, and hence the rear gangs are termed inthrow gangs.

The hitch means 2 includes a drawbar unit 31 connected by a pivot block 32 to the front end of the frame 5, and the drawbar 31 consists of a pair of laterally spaced members 33 and 34, the rear ends of which are welded to a part 35 that is pivoted to the pivot block 32. A channel member 37 forms the forward portion of the drawbar 31 and includes a rear section 38 which is slidable between the rear drawbar members 33 and 34. A stop 39 is fixed to the rear end of the channel 37 and limits the forward movement of the latter member relative to the rear drawbar members 33, 34. A slide 41 is disposed for fore and aft movement on the forward portion of the channel 37 and is connected by links 42 to the outer ends of the front gangs 6 and 7, the links being pivotally connected at their front and rear ends to the slide and frames 10 of the front gangs. The movement of the slide 41 relative to the channel 37 is controlled by a manually operable latch unit 43. By suitable operation of the slide latch 43 and by driving the tractor forwardly or backwardly, to shift the channel member 37 relative to the rear drawbar sections 33, 34, the front gangs may be swung forwardly into an angled working position, as shown in Figure 1, or shifted rearwardly into a transport or parallel position, as desired. In a disk harrow of this type, the aforesaid movement of the front gangs is made use of for swinging the rear gangs 20 and 21 into and out of angled and working positions, each front gang being connected to its rear gang by connecting linkage 4 referred to above. The interconnecting linkage will now be described.

Secured to the rear portion of the frame 10 of each front gang is an angling lever or bracket 50 which includes a main arm section 51 and a bracing section 52, the sections 51 and 52 being bolted or otherwise rigidly fixed to the gang frame of the associated gang. Secured to the front portion of the associated rear gang is a rear angling lever or bracket, indicated in its entirety by the reference numeral 53, and which comprises a main arm or bracket section 54 and a bracing section 55 bolted or otherwise fixed to the gang frame of the associated rear gang. The forward arm or bracket section 51 is provided with a plurality of openings 57 and the rear bracket or arm section 54 is provided at its forward end with an opening 58.

An angling link 60 is provided for interconnecting the rear end of the arm or bracket section 51 with the forward end of the associated rear arm or bracket section 54, and since the gang angling linkage is the same at each side of the tractor, a description of one of the links 60 will suffice. The link member 60 comprises an upper bar 62 and a lower bar 63 having their ends provided with apertures 64 and 65. The bars 62 and 63 are spaced apart by hollow or tubular bushing members 67, the length of which is materially greater than the thickness of the associated bracket portions, and the outer surfaces 68 of the bushing members 67 are curved approximating an ellipsoid or sphere, the diameter of which is substantially the same as the openings in the arms or brackets 51 and 54. The thickness of each of the arms 51 and 54 is slightly greater than one half the length of one of the bushings 67, so that there is no play or lost motion even when, for example, the upper bar 62 rests flat against either one or both of the arms 51 and 54.

A bolt 69 is disposed in the openings at each end of the bars 62 and 63 and extends through the associated hollow or tubular bushing 67. Tightening the bolts 69 acts through the tubular bushings 67 to connect the bars 62 and 63 rigidly together and hold them in such spaced apart relation that rocking of the link member 60 relative to the brackets in a direction generally transverse to the planes thereof is permitted, Figure 2 showing the positions these parts occupy when, for example, the outer end of the rear gang drops into a depression while the front gang remains on level ground. It will be seen from Figure 2 that the approximately spherical configuration of the outer portions of the bushings 67 accommodates the aforesaid angular displacements but without requiring loose connections or the like which would render accurate control of the gang angles impossible, yet by virtue of the aforesaid spacing between the bars 62 and 63, the link 60 is permitted to take an angular position relative to the brackets which it interconnects.

Figure 3:
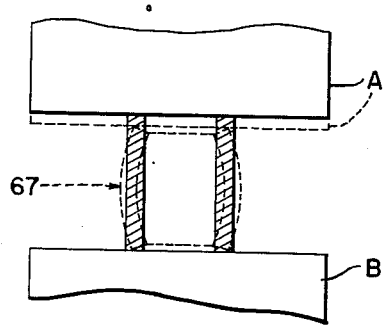
Figure 3 is a detail view showing how the spherical bushings are formed.
Figure 4:
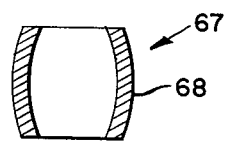
Figure 4 is a sectional view of the spherical bushing.

The bushings 67 preferably are manufactured by the process outlined in Figure 3. According to this method cylindrical tubular bushings, which may be short pipe sections or the like, of the requisite length, are placed in a press or the like and the latter operated to compress the bushings axially, the upper and lower members of the press being indicated by the reference characters A and B. When the members are brought toward one another the cylindrical bushing is forced to take a substantially spherical configuration, as indicated by dotted lines in Figure 3.

While I have shown and described above the preferred structure in which the principles of the present invention have been incorporated, it is to be understood that my invention is not to be limited to the particular details shown and described above, but that, in fact widely different means may be employed in the practice of the broader aspects of my invention.

What I claim, therefore, and desire to secure by Letters Patent is:

1. For use in a disk harrow having front and rear gangs each including a gang frame, and a forwardly extending bracket fixed to the rear gang frame and a rearwardly extending bracket fixed to the front gang frame, each bracket having a generally cylindrical opening in its outer end, the improvement comprising a rigid connecting link adapted to transmit forces in compression and in tension and extending between said brackets said rigid connecting link comprising a member having at each end apertured upper and lower sections adapted to embrace the apertured portion of the associated bracket and said sections being spaced apart to receive said bracket with clearance between the faces of the latter and the adjacent faces of said sections, a bushing disposed between each pair of apertured link sections and disposed in the opening in the associated bracket, the outer surface of each bushing being outwardly curved and having an outer diameter that is substantially equal to the diameter of the opening in the associated bracket, thereby accommodating rocking of one gang relative to the other in a generally vertical direction, the clearance between said sections and the adjacent faces of said bracket being so related that, in any position of the bracket between said sections, the portion of the associated bushing of greatest diameter lies within the cylindrical wall of the opening of the associated bracket, thereby eliminating any looseness or lost motion between the brackets and the associated bushing in any angular position of one relative to the other within the limits of the clearance between said upper and lower sections and the associated bracket, and fastening means extending through the openings in the associated link sections for fixing said bushing in place therebetween.

2. The combination with a disk harrow having front and rear gangs each including a gang frame, and a forwardly extending bracket fixed to the rear gang frame and a rearwardly extending bracket fixed to the front gang frame, each bracket having a cylindrical opening in its outer end, of strut means connected between said brackets for transmitting forces either in tension or compression, and comprising a connecting link including a pair of spaced apart bars having apertured ends, said bars being adapted to embrace the apertured portions of the associated front and rear brackets, the bars being spaced apart a distance greater than the thickness of the associated brackets whereby said link may be rocked angularly at least a limited amount relative to the plane of the bracket at either end of the link, a hollow bushing disposed between said bars at each end of said link generally in alignment with the axis at the ends of said bars, each of said hollow bushings being disposed in the aperture in the outer end of the associated bracket, the outer surface of each bushing being approximately spherical, the axial length of each bushing and the distance between said bars being such that in any angular position of either bracket relative to the associated bushing, the portion of the bushing of maximum diameter is received within the cylindrical opening of the associated bracket, thereby eliminating lost motion and looseness between each bracket and the associated bushing in any position of one relative to the other, and fastening means extending through each bushing and the openings in the associated bars for fixing the bushings in place between said bars and holding said bars in said spaced apart relation, so as to accommodate rocking of one gang relative to the other in a generally vertical direction.

CHARLES H. WHITE.

REFERENCES CITED

The following references are of record in the file of this patent:

UNITED STATES PATENTS

| Number | Name | Date |
|---|---|---|
| 1,512,609 | Koelkebeck | Oct. 21, 1924 |
| 2,013,546 | Wallace | Sept. 3, 1935 |
| 2,090,395 | Cartledge | Aug. 17, 1937 |
| 2,339,124 | White | Jan. 11, 1944 |